United States Patent [19]

Halfon

[11] 4,323,032
[45] Apr. 6, 1982

[54] FISH TANK AND AQUARIUM

[76] Inventor: Leon Halfon, 2146 Fargo St., Los Angeles, Calif. 90039

[21] Appl. No.: 166,819

[22] Filed: Jul. 8, 1980

[51] Int. Cl.³ .............................................. A01K 64/00
[52] U.S. Cl. ....................................................... 119/5
[58] Field of Search ........................ 119/5; 229/15, 42

[56] References Cited

U.S. PATENT DOCUMENTS

| | | | |
|---|---|---|---|
| 2,743,050 | 4/1956 | Crane | 229/15 |
| 3,038,625 | 6/1962 | Sinner et al. | 119/15 X |
| 3,255,731 | 6/1966 | Girard | 119/5 X |
| 3,291,098 | 12/1966 | Halpert | 119/5 |
| 3,908,598 | 9/1975 | Jewson | 119/5 |
| 4,120,265 | 10/1978 | Davis | 119/5 |

Primary Examiner—Gene Mancene
Assistant Examiner—Robert P. Swiatek
Attorney, Agent, or Firm—Thomas A. Fournie

[57] ABSTRACT

A tank suitable for use as a fish tank having glass bottom and side walls with V-shaped brace members mounted in the bottom of the tank to extend transversely thereacross between opposed ones of the tank's side walls. The V-shaped braces are formed by a pair of planar support members joined together in a watertight seal along their upper disposed edges and are symmetrically constructed about the vertical axis. The planar support members are secured on their ends to the tank opposed side walls to extend upwardly from the tank bottom to a selected height below the tank's designed water surface level but above the water depth at which water pressure in the tank would otherwise break the opposed glass side walls. The V-shaped braces further define voids in the tank bottom suitable for use for decorative purposes and also function to divide the ground or bottom area of the fish tank into separate zones so as to reduce the tendency of fights between dominant fish during mating season. The tank is arranged to receive insertable partition members which cooperate with the V-shaped braces in segregating one portion of the tank from another.

11 Claims, 1 Drawing Figure

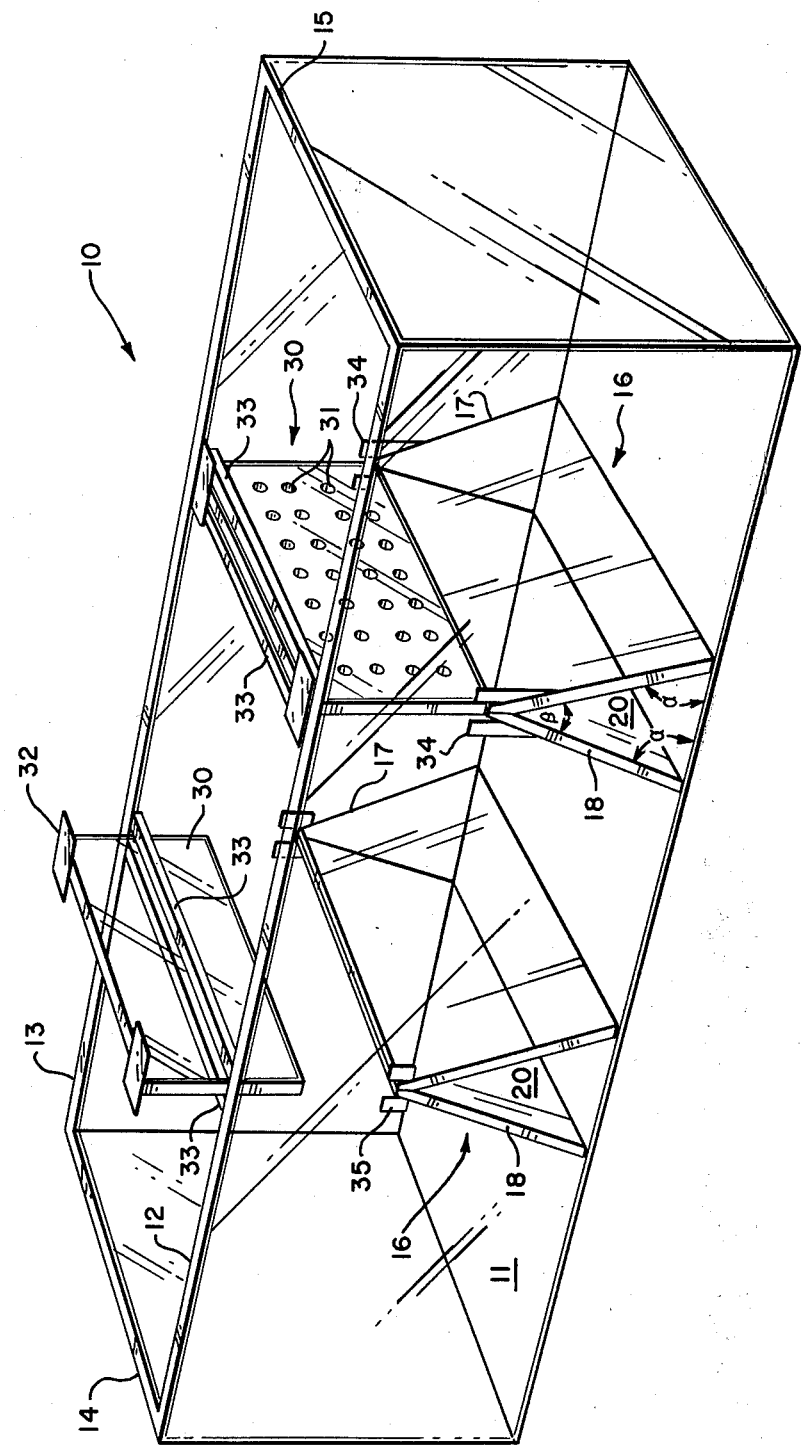

FISH TANK AND AQUARIUM

BACKGROUND OF THE INVENTION

The present invention relates to aquariums and tanks for holding water, and particularly to an improved type of such tank suitable for use as a fish tank.

Heretofore, aquariums and fish tanks have generally been made of a planar see-through material like panes of glass.

A problem with the use of glass panes is their lack of flexibility, and hence inherent breakability, particularly in the case of glass panes of large area. As a consequence, in order to construct tanks of increased depth and size, it has generally been necessary to substantially increase the thickness of the glass panes used. This is due to the fact that the pressure exerted by the water in the tank increases in direct proportion to its depth, that is to say, the pressure exerted by water at a two foot depth in a tank is double the pressure exerted at one foot depth therein.

The need to increase the thickness of the glass panes used in such tanks as their depths are increased has several drawbacks and disadvantages. Firstly, there is a significant increase in tank cost, a pane of ½" glass being, for example, much more expensive than a similarly sized ¼" thick pane of glass. Further, the weight, and hence mobility, of such tanks is significantly affected by such need to use thicker glass panes.

SUMMARY OF THE INVENTION

It is an object of the present invention to provide an improved tank suitable for use as a fish tank which obviates the aforementioned disadvantages and drawbacks of the prior art.

It is further an object of the present invention to provide such an improved tank constructed of glass panes characterized by being of an improved construction of increased strength so as to enable the use of less-thick, and hence lighter and less expensive, glass panes therein.

In accomplishing these and other objects, there is provided a fish tank having glass bottom and side walls with V-shaped brace members or structures mounted in the bottom of the tank to extend transversely thereacross between opposed side walls of the tank. The V-shaped brace members are characterized by being constructed symmetrically about the vertical axis and by extending on their ends from the bottom of the tank and upwardly to a selected height on the tank's side walls below the tank's designed water surface level but above the water depth at which water pressure in the tank would otherwise break the opposed glass side walls.

The V-shaped brace members are formed by a pair of planar support members joined together in a watertight seal along their upper edges, function to strengthen the lower portion of the fish tank where water pressure is the greatest, and preferably define voids which can be used for decoration or as terrariums. The V-shaped brace structures additionally function to divide the ground or bottom area of the fish tank into separate zones, so as to reduce the tendency of so-called dominant fish having territorial fights with each other during mating season.

Further, the tanks may be arranged to receive insertable partition members which cooperate with the V-shaped brace structures in isolating one portion of the tank from another.

Additional objects of the present invention reside in the specific construction of the embodiment of fish tank and aquarium hereinafter described in conjunction with the accompanying single FIGURE drawing.

BRIEF DESCRIPTION OF THE DRAWING

The single FIGURE drawing is a perspective view of an aquarium and fish tank according to the present invention.

DETAILED DESCRIPTION OF THE PREFERRED EMBODIMENT

Referring to the single FIGURE drawing, there is shown an aquarium or fish tank generally identified by the numeral 10. The tank 10 illustrated is constructed in a rectangular shape and is made up of a horizontally disposed bottom wall 11, vertically disposed side walls 12 and 13 defining its longitudinal sides, and vertically disposed side walls 14 and 15 defining its ends. Each of the tank walls 11-15 is made of a unitary pane of glass of selected uniform thickness and they are adhered to each other in a conventional manner, such as by a waterproof epoxy glue or adhesive material, to form a watertight container.

Formed on the bottom of the tank 10 to extend transversely thereacross are transparent V-shaped brace members or structures 16. Each of the brace members 16 are formed by two similar rectangularly shaped glass plates 17 and 18 of selected uniform thickness, which are joined together along their upper edges in a conventional manner to form a waterproof seal thereat. Further, the side and bottom edges of the glass plates 17, 18 are secured to the tank side and bottom walls, respectively, in a conventional manner to form waterproof seals therewith. These aforementioned seals may be formed, for example, by use of a suitable waterproof epoxy sealant.

The glass plates 17, 18 forming the two V-shaped brace structures 16 illustrated extend perpendicularly to the tank side walls 12 and 13 and define air and water tight triangular voids 20 in the bottom of the tank 10. These plates 17 and 18 are further illustrated positioned symmetrically to the vertical with respect to each other so as to each intersect the tank bottom 11 at the same angle, designated alpha in the drawing. The downward facing angle of intersection defined within the voids 20 by the intersection of the plates 17 and 18 is preferably less than 90° and is designated beta. Thereby, pressure forces exerted by the water in the tank 10 against the V-shaped brace structure 16 have a larger lateral, than downward, component and are predominantly counter-balancing.

The ends of the glass plates 17, 18 further extend from the tank bottom 11 to a selected height on the tank side walls 12, 13. This selected height is determined by the thickness and area of the glass plates 17, 18 and water depth in the tank 10, and must be above the point at which the depth increasing water pressure would otherwise cause the glass plates 17 and 18 to break.

The two V-shaped brace members 16 of the tank 10 are shown located equidistant from the tank end walls 14, 15 and each other to provide a relatively balanced support for the glass walls 12 and 13 along the length of the tank 10.

Associated with each of the V-shaped brace members 16 are partition or division members 30. The partition members are inserted into the tank 10 by lowering them between parallel support bars 33 which are mounted to extend transversely across the top of the tank 10. The support bars 33 are mounted in pairs to define a longitudinal partition receiving slot in alignment with and above the line of intersection of the upper edges of the plates 17, 18 forming the V-shaped braces 16.

One partition member 30 is shown with openings 31 therein so that water or small fish may circulate or pass therethrough, while the other partition member 30 is shown solid. The partition members 30 may be made of any suitable material, such as a clear plastic, light glass or the like. Rigid tabs 32 are secured across the top edge of each partition member 30 which function as hand grips for lowering a partition 30 into the tank 10 or lifting it therefrom. These tabs 32 further function as support members which support the partitions 30 in vertically hanging positions on the pairs of traverse support bars 33.

In order to positively prevent side to side movement of a partition member 30 when same is inserted into the tank 10 between traverse support bars 33, vertically extending stop members 34 may be formed on the V-shaped brace members 16 to extend above the brace members 16 along the sides of the partitions 30. Such stop members 34 are shown associated with one of the V-shaped brace members 16, and may be made of any suitable material, such as transparent glass or plastic; and may be secured on the V-shaped brace members 16 by a suitable waterproof epoxy. It is noted that the partition members 30 are appropriately sized to effectively laterally close off the tank 10 at the locations of the V-shaped members 16. Such is illustrated in the drawing by the partition member 30 which is fully inserted.

Alternately and in lieu of mounting stop members 34 on the brace structure 16, stops 35 could be adhesively secured in appropriate positions on the side walls 12, 13 of the tank 10. Such is shown in the drawing associated with the partially inserted partition member 30.

The inventor has constructed fish tanks in accordance with the present invention and like the aforedescribed tank 10. In so doing, the inventor has discovered that the V-shaped brace structures surprisingly significantly increase the water pressure supporting capability of the tank's side walls so that thinner, less expensive and lighter glass panes can be utilized in tank construction. For example, ¼' thick glass panes may be used where ½" glass panes were heretofore required.

Further, the inventor has found that the V-shaped brace structures 16 function to divide the ground or bottom area of the fish tank 10 into separate zones. This has an inherent advantage since certain fish during mating season become so-called "dominant". Such fish tend to fight and kill each other if they are within the same ground area. Thus, the division of the fish tank 10 into several ground areas allows one dominant fish to isolate itself from the others and hence tends to avoid fighting between the fish when several are going through their mating season at the same time. Further, the partition member 30 may be used in cooperation with the V-shaped braces to absolutely segregate such dominant fish.

Additionally, the voids 20 defined in the fish tank 10 can be used for decorative purposes or terrariums.

Although the invention has been herein shown and described in what is conceived to be the most practical and preferred embodiment, it is recognized that departures may be made from such preferred embodiment within the scope of the invention.

I claim:

1. A substantially rectangularly shaped watertight tank having a longitudinal axis suitable for use as an aquarium or fish tank, comprising:
   a bottom portion defined as a substantially flat surface;
   four upwardly extending vertical side walls enclosing said bottom portion, each of said side walls being also substantially flat and disposed normally to each other and to said flat tank bottom portion; and
   at least one V-shaped brace member formed in the bottom of said tank to open downwardly and extend transversely across said bottom portion of said tank between opposed ones of said vertical side walls substantially normal to the longitudinal axis of said tank, said at least one V-shaped brace member being formed by a pair of planar support members disposed substantially normal to said opposed side walls and joined in a watertight seal along their upper disposed edges and along their lower and end edges, respectively, to said tank bottom portion and opposed tank side walls, said opposed side walls between which said at least one V-shaped brace member extends being each made of a unitary plate of glass of selected uniform thickness and the ends of said at least one V-shaped brace member joined to said opposed side walls and extending from said tank bottom portion upwardly on said opposed side walls to a selected height below said tank's designed water surface level but above the water depth at which water pressure in said tank would otherwise break said opposed glass side walls thereby to surprisingly and significantly increase the water pressure supporting capability of said opposed glass side walls so that thinner, less expensive and lighter glass panes can be utilized.

2. The invention defined in claim 1, wherein said planar support members defining said at least one V-shaped brace member are disposed on opposite sides of the vertical plane symmetrically with respect to each other and the vertical plane.

3. The invention defined in claim 2, wherein the downwardly opening angle defined by said planar support members forming said at least one V-shaped brace member is less than 90°.

4. The invention defined in claim 3, wherein a plurality of V-shaped brace members are formed in the bottom of said tank to extend transversely across and substantially normal to the longitudinal axis thereof.

5. The invention defined in claim 4, wherein said plurality of V-shaped brace members are located at points equidistant along the length of said tank with respect to each other and the ends of said tank.

6. The invention defined in claim 4, including selectively insertable partition means associated with each of said V-shaped brace members for selectively closing off said tank thereat.

7. The invention defined in claim 1, wherein said planar support members forming said at least one V-shaped brace member are also made of glass and are transparent to define on said tank bottom voids which may be utilized for decorative purposes.

8. The invention defined in claim 1, wherein a plurality of V-shaped brace members are formed in the bottom of said tank to extend across said bottom portion and between said side walls.

9. The invention defined in claim 1, including a selectively insertable partition means associated with said at least one V-shaped brace member for selectively closing off said tank thereat.

10. A watertight tank suitable for use as an aquarium or fish tank, comprising:
a bottom portion;
upwardly extending side walls enclosing said bottom portion;
at least one V-shaped brace member formed in the bottom of said tank to open downwardly and extend across said bottom portion and between said side walls, said at least one V-shaped brace member being formed by a pair of planar support members joined in a watertight seal along their upper disposed edges and along their lower and end edges, respectively, to said tank bottom portion and tank side walls; and
a selectively insertable partition means associated with said at least one V-shaped brace member for selectively closing off said tank thereat.

11. The invention defined in claim 10, wherein:
said tank has a longitudinal axis, four side walls and a substantially rectangular shape; and
a plurality of V-shaped brace members are formed in the bottom of said tank to extend between opposed ones of said side walls transversely across and substantially normal to the longitudinal axis of said tank, one of said selectively insertable partition means being associated with each of said V-shaped brace members.

* * * * *